(No Model.) 4 Sheets—Sheet 3.
E. E. RIES.
HEATING RAILWAY CARS BY ELECTRO CHEMICAL MEANS.
No. 381,819. Patented Apr. 24, 1888.
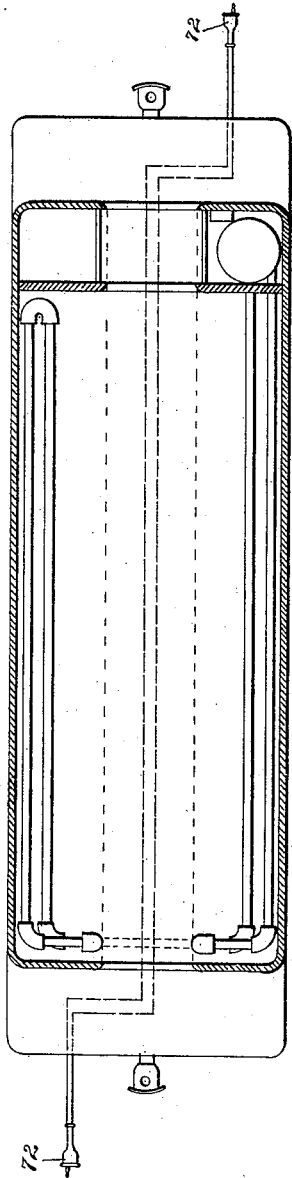
*Fig. 9.*
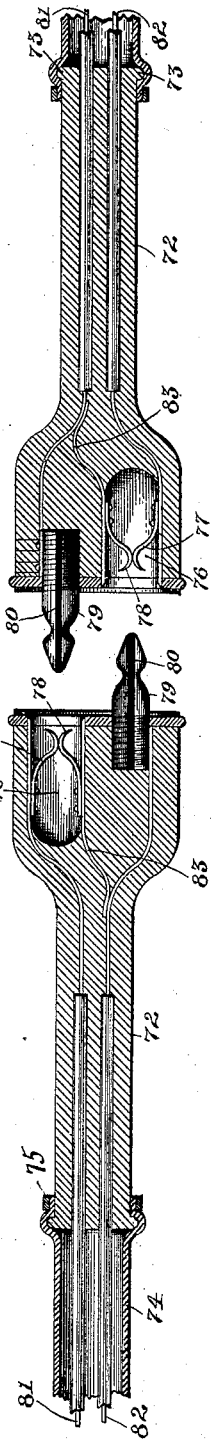
*Fig. 11.*
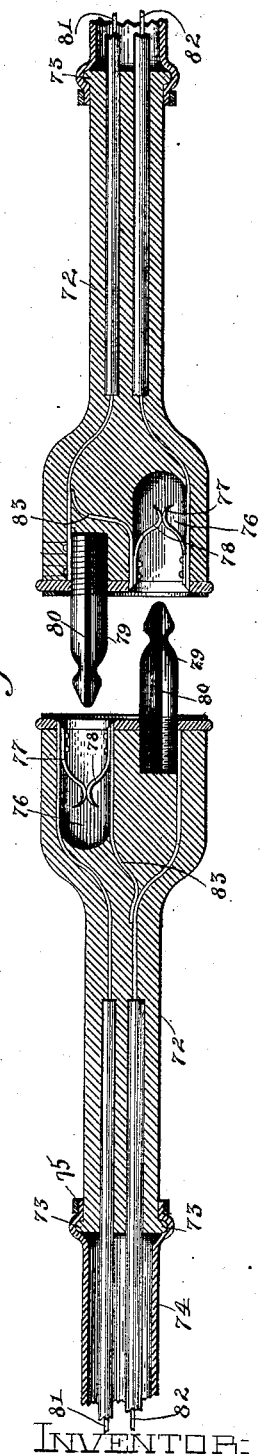
*Fig. 11ª.*
ATTEST:
Percy C. Bowen
C. B. Waller
INVENTOR:
Elias E. Ries
By Harding & Tichenor
His Attorneys.

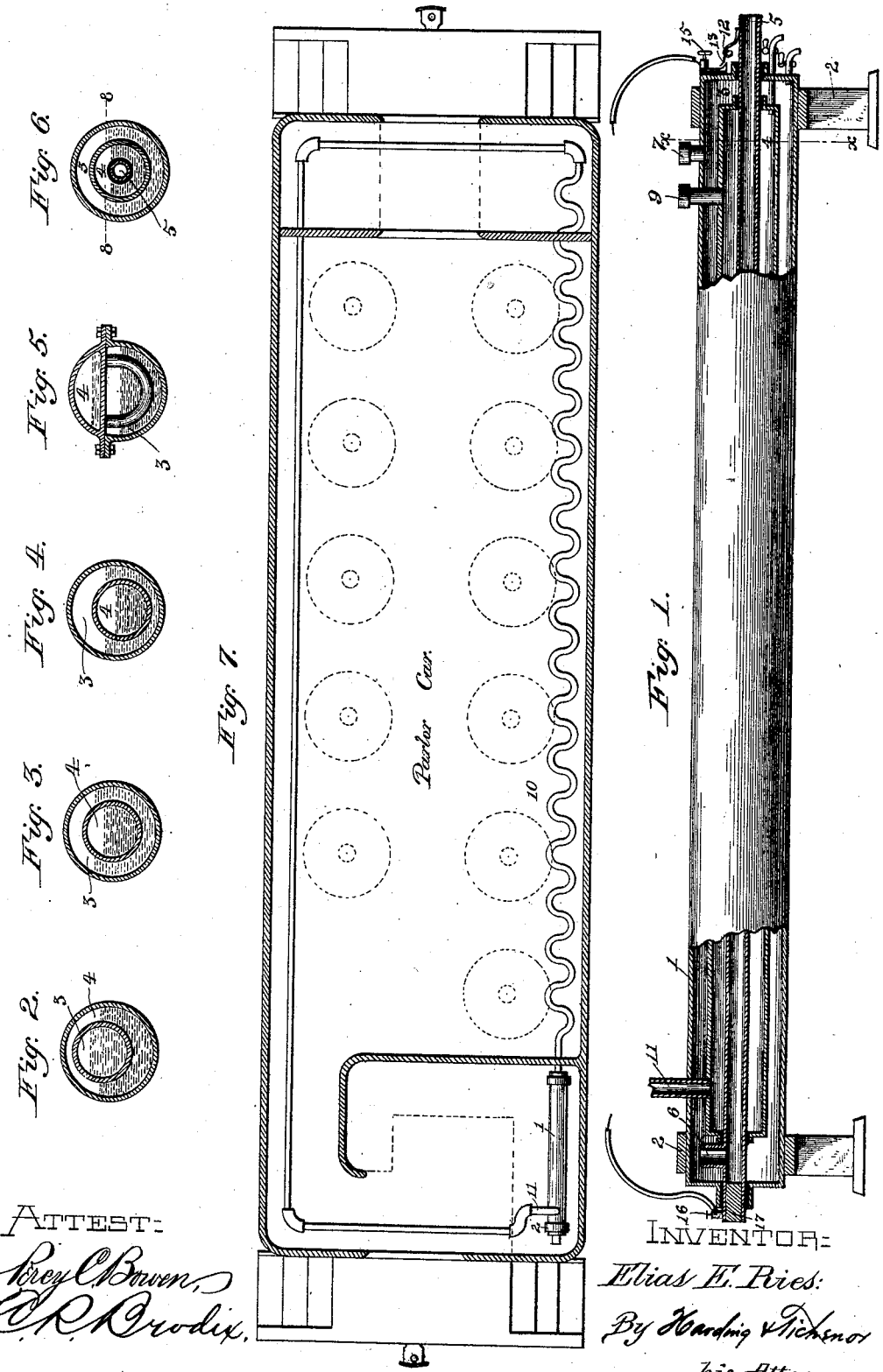

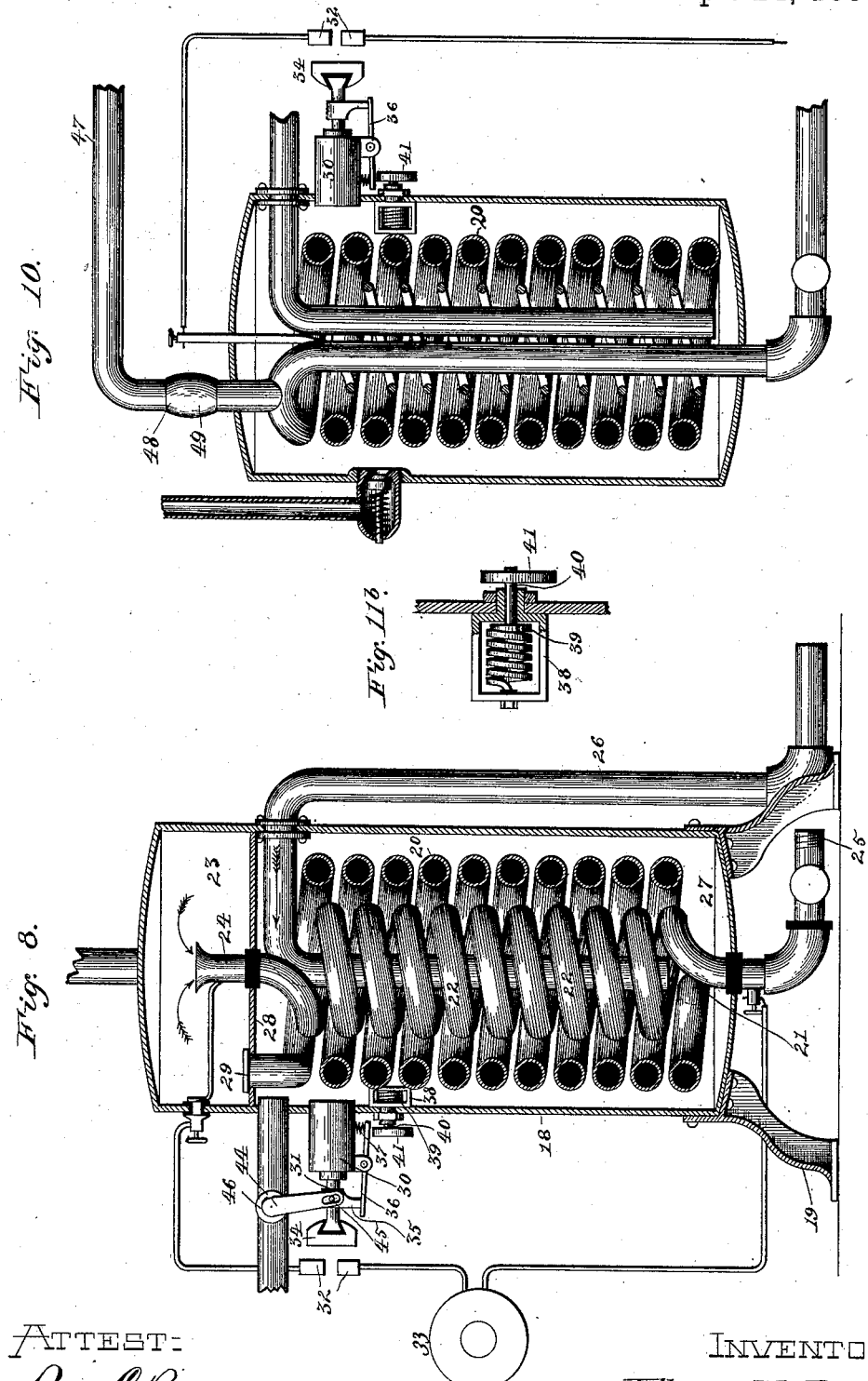

(No Model.) 4 Sheets—Sheet 4.
E. E. RIES.
HEATING RAILWAY CARS BY ELECTRO CHEMICAL MEANS.
No. 381,819. Patented Apr. 24, 1888.
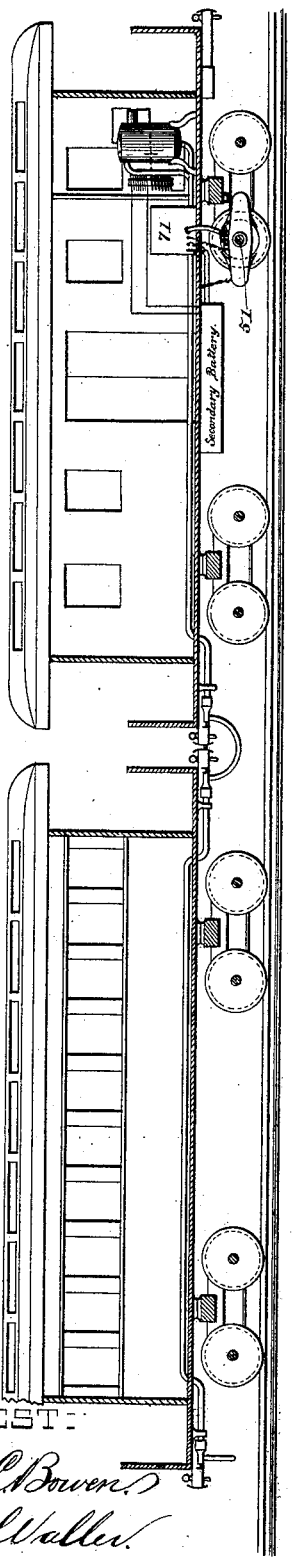
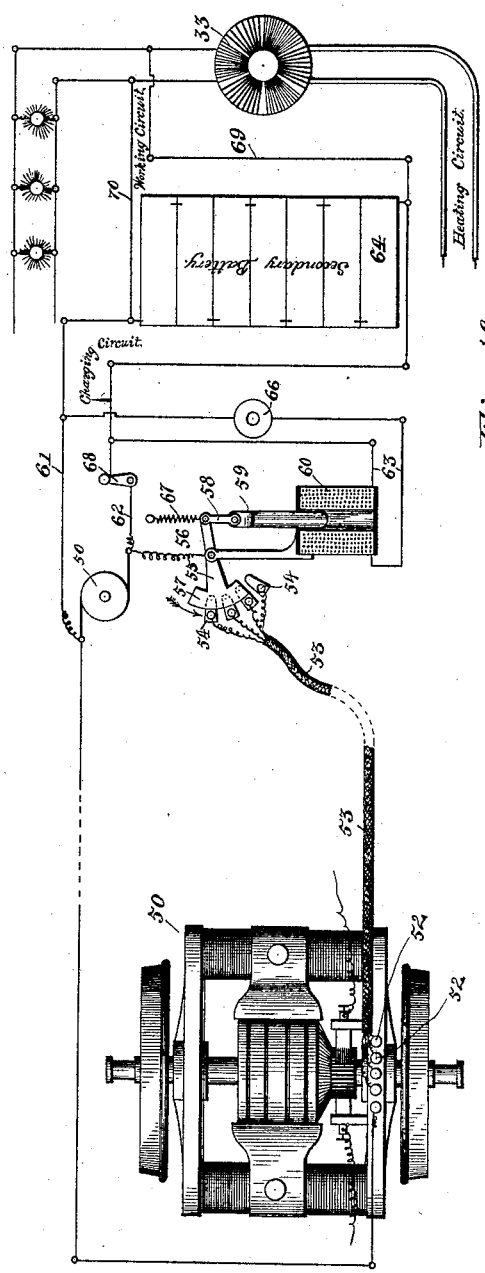
ATTEST:
Percy C. Bowen
C. B. Waller
INVENTOR:
Elias E. Ries
By Harding & Fichens
his Attorneys.

UNITED STATES PATENT OFFICE.

ELIAS E. RIES, OF BALTIMORE, MARYLAND, ASSIGNOR OF ONE-HALF TO ALBERT H. HENDERSON, OF SAME PLACE.

HEATING RAILWAY-CARS BY ELECTRO-CHEMICAL MEANS.

SPECIFICATION forming part of Letters Patent No. 381,819, dated April 24, 1888.

Application filed June 28, 1887. Serial No. 242,790. (No model.)

*To all whom it may concern:*

Be it known that I, ELIAS E. RIES, a citizen of the United States, residing at Baltimore, in the State of Maryland, have invented certain new and useful Improvements in Heating Railway-Cars by Electro-Chemical Means; and I do hereby declare the following to be a full, clear, and exact description of the invention, such as will enable others skilled in the art to which it appertains to make and use the same.

My invention relates to a system of heating railway-cars by electro chemical means, and has for its particular object to utilize and adapt for this purpose the method and apparatus described, illustrated, and claimed in my separate pending application for Letters Patent filed June 22, 1887, Serial No. 242,125, which discloses and contemplates the idea of generating steam from a requisite quantity of water by the caustic action of soda, potash, lye, or their equivalents in apparatus of novel and suitable construction, distributing the steam so generated to different points of consumption, employing the exhaust-steam to extend and re-enforce the activity of said caustic substance by absorption, and to revivify and re-concentrate the same, both by evaporating the undesirable moisture due to the oversaturation of said caustic solution by the exhaust-steam and in reheating such caustic substance by subjecting it to the heating agency of an electric current. Therefore, in order to adapt these principles which are embraced in the before-mentioned application for this particular purpose, I have devised a certain novel organization of apparatus for carrying out this idea in a safe, advantageous, and convenient manner, whereby the heating of trains—now an intricate and perplexing problem—may be efficiently and readily performed without the presence of fire or any attendant risk or casualties whatever in case of an accident or disaster. A further desideratum in this system is the economical labor-saving method employed, which renders my invention valuable, because of its cheapness in first cost and maintenance.

In the accompanying drawings, which form a component of this application, Figure 1 is a view in side elevation of a horizontal form of boiler or generator with parts broken away to show the interior construction. Figs. 2, 3, 4, and 5 are transverse sections of modifications of Fig. 1, showing different forms of soda-heating apparatus, the distinctive features and difference in which will be hereinafter pointed out. Fig. 6 is a transverse section on line $xx$ of Fig. 1. Fig. 7 is a diagrammatical view of a railway parlor-car provided with the form of boiler shown in Fig. 1, which is arranged under the seats in the smoking-room, and is provided with steam radiating and distributing pipes for heating the whole interior of the car, as will be readily comprehended from an inspection of the figure taken in conjunction with the description hereinafter. Fig. 8 is a vertical transverse section of an upright form of boiler, which can be utilized in a similar manner as shown conventionally in Fig. 9, which illustrates substantially the same arrangement of distributing and radiating pipes and location of boiler as in Fig. 7. Fig. 10 is a modified form of the boiler shown in Figs. 8 and 9. Fig. 11 is a detail view showing in section a novel form of an electrical coupling device which is designed to preserve the electrical continuity of the circuit between the several cars of the train. Fig. 11$^a$ is a modification of Fig. 11. Fig. 11$^b$ is a detail view of expansible thermostat. Fig. 12 is a view in side elevation of two cars of a railway-train, the forward coach or baggage-car being provided with the form of boiler shown in Figs. 8 and 10, and the car or cars in rear thereof are designed to be heated by steam-distributing pipes having suitable couplings between the said cars. This view also shows conventionally the electro-generator geared to the axle of the baggage-car, the primary or charging circuit extending therefrom through a current-regulator to a secondary battery, the working-circuit from said battery to a suitable transformer, and the secondary or heating circuit to the boiler. Fig. 13 is a top plan view of the generator shown in Fig. 12. Fig. 14 is a diagram of the circuits, the battery, current-regulator, and transformer shown in Fig. 12, the primary or charging circuit being connected by dotted lines with the circuit of the generator illustrated in Fig. 13.

Like numbers of reference designate like or corresponding parts in the several views.

Referring to Fig. 1, 1 indicates a horizontal form of boiler or generator, whose exterior cylindrical casing is formed of hammered boiler iron or steel, and is supported in and upon a suitable base, 2, of any suitable or desired construction, which is designed to be securely affixed to the body of the car in which it is located. The interior of this boiler is divided into three compartments—one for the water, one for the soda, and the other for the superheated steam. 3 is the water-compartment, which concentrically envelops the soda-compartment 4, which latter is in point of length and diameter somewhat smaller than the compartment 3, as shown. 5 is the passage for the superheated steam, consisting of a horizontal central pipe encircled by the soda-reservoir and communicating with the water-chamber 3 by the short nozzle 6.

The water is introduced through the nozzle 7 (which is provided with a removable air-tight cap) up to the water-line 8 8, as shown in Fig. 6, the remaining space above said line being reserved as the reservoir for the steam generated from the water by a process hereinafter explained. The caustic soda, potash, lye, or their equivalent is admitted into the chamber 4 through a similar nozzle, 9. Thus it will be understood that by means of the caustic properties or heating agency of the caustic solution steam is generated from the adjacent water and rises into the steam-space above the water-line 8 8, from whence it is conducted by its flue or nozzle 6 into the superheating-tube 5, where it is superheated by passing horizontally through the caustic solution for the purpose of rendering it more expansible and drier. From the superheating-chamber the said steam is forced in the distributing-pipe 10 (see Fig. 7) throughout the entire car and returns by the exhaust-pipe 11 into the compartment containing the soda solution in the top of the chamber 4, where it will be freely absorbed by the said solution for a great length of time before it completely saturates the contents. However, in course of time the soda will become thoroughly permeated with moisture and will cease to further absorb the exhaust steam, at which time it will be obvious that the solution must be evaporated, reheated, and reconcentrated. In order to accomplish this, I have devised means for automatically closing an electric circuit simultaneously with the decrease beyond a certain point of the working temperature of the soda, so that an electric current of the required heating effect will be conducted directly through the solution for the purpose of evaporating the moisture deposited by the exhaust and for reconcentrating, reheating, and revivifying the same to the necessary working temperature. The mechanism employed for this purpose is as follows:

On the open end of the pipe 5 is riveted an automatic thermostat, which consists of a continuous strip of metal coiled, as shown, at the point 12, and susceptible to expansion and contraction, according to the temperature of said pipe. This coiled strip is normally out of contact with the contact terminal or lip 13 of the secondary circuit from a suitable transformer, 33, (see Fig. 8,) as the exhaust-heat from the caustic solution is sufficient to keep the coil 12 expanded, so as to be out of contact with the terminal 13; but should the pipe 5 become cool, owing to the decrease of the heating properties of the solution contained in the chamber 4, the coil will contract and make contact with the terminal 13, thereby closing the secondary circuit from the transformer 33 and causing the current of low potential and heavy heating effect to traverse its conductor, (the pipe 5,) thus raising the temperature of the solution and evaporating the surplus moisture absorbed by it and restoring its original degree of concentration. The current will continue to traverse its path from the binding-post 15 to the binding post 16, over the pipe 5, until the coil 12 will, by virtue of increased temperature, expand and break contact. As will be seen, one end of the pipe 5 is hermetically sealed with a metallic current-conducting plug, 17, at one end, and is insulated from the casing 1 and the walls of the chamber 4, so as to prevent a short circuit. When the soda solution becomes completely saturated with the exhaust-steam and refuses to absorb it further, the natural sequence will be a back-pressure in the pipe 11. Therefore in practice it would be preferable to connect a branch or blow-off pipe provided with a spring safety-valve, in order to afford an egress or vent for such back-pressure, which is preferably placed in the discharge-pipe through which the evaporated moisture escapes. However, as this is a mere detail, it is not deemed necessary to illustrate the same in Fig. 1.

Referring to Fig. 7, it will be seen that the distributing-pipe 10 is arranged in a serpentine or undulating manner on one side of the car and on the other is continued in the ordinary way back to the boiler. By the former construction it will be apparent that a greater surface is afforded for the radiation of heat. While the latter construction is the form ordinarily employed for the steam-distributing pipes of railway-cars, either form might be utilized, according to requirements.

Referring to the modifications shown in Figs. 2, 3, 4, and 5, the construction shown in Fig. 2 illustrates the water-chamber located within the soda-compartment. In this form of apparatus the soda is designed to partly warm the surrounding air by direct radiation, the heat from the stationary radiator being used to warm small compartments. In Figs. 3 and 4 the soda compartment or reservoir is within the water-chamber, and the soda-receptacle in Fig. 5 is in the shape of a hollow trough, as shown, the steam-reservoir above it having depending water-tubes that project into the soda solution and expose a large surface to the heating action thereof. In all these forms of heat-generators the steam is led off from the top of the steam-space by the distributing-pipes, except in the construction shown in Fig. 1, there being, as before stated, no distributing pipes employed in connection therewith, the absorption of part of the generated steam being entirely local. However, even this form of generator might be utilized for the dual purpose of direct radiation and steam distribution, inasmuch as its construction is conducive to direct radiation, and at the same time the ordinary distributing-pipes 1° (shown in Fig. 7) might be connected thereto.

Referring to the form of boiler shown in Figs. 9, 12, 13, and 14, and more clearly in Figs. 8 and 10, 18 indicates the exterior casing, formed, preferably, of boiler iron or steel and supported vertically by a suitable base, as shown conventionally at 19. Within this cylindrical casing is located an upright coil, 20, which contains the water admitted thereto through the lower extremity, 21, from a suitable source (not shown) under pressure. 22 designates a smaller or superheating coil, which is vertically suspended within and enveloped by the coil 20, and communicates with the steam-chest 23 by the flaring mouth or pipe 24, as shown. The lower end of this coil is connected by a suitable coupling with the steam-distributing pipe 25, which in turn passes throughout the car or cars, as shown in Figs. 9 and 12, the exhaust or return pipe 26 entering near the bottom of the interior chamber, 27, (see Fig. 8,) of the boiler, which chamber contains the soda or other caustic solution. Thus it will be understood that, inasmuch as this said solution surrounds on all sides the water and steam coils, and the water has been introduced into the coil 20 up to near the diaphragm 28, or bottom of the steam-chest 23, the heating property of the said solution will generate steam from the water in the coil 20, which steam will rise through the nozzle 29 into the steam-chest 23, from whence it will be conducted or deflected by the pipe 24, as shown by the arrows in Fig. 8, into and down through the superheating-coil 22, it being there superheated by the agency of the surrounding and adjacent solution, thereby obviously decreasing the amount required for heating purposes, inasmuch as it is by the said superheating process rendered more expansible and drier. From this coil 22 the steam is admitted to the distributing-pipe 25, and after circulating throughout the car or cars (see Figs. 9 and 12) returns by the exhaust-pipe 26 into the soda solution, near the bottom of the chamber 27, where it will be absorbed by the soda for a great length of time before the solution refuses to further freely absorb the exhaust-steam. However, in course of time the soda will become thoroughly saturated with the exhaust, and back-pressure will therefore be evinced. In such event I have devised electro-mechanical means for automatically opening a safety or blow-off pipe and for simultaneously closing an electric circuit, so that a current of the requisite heating effect will be conducted through the solution for the purpose of evaporating the moisture deposited by the exhaust, and for reconcentrating, reheating, and revivifying the same up to the necessary working temperature. In order to effect this result the following mechanism may be employed.

30 is a back-pressure cylinder, which has its open end protruding into the chamber 27.

A bridge-piece, 34, insulated from and attached to the outer end of the piston-rod 31, is adapted to make contact with the terminals 32 32 in the secondary circuit from the transformer 33, and to the piston-rod 31 is attached a small cam projection, 35, against the lower end of which rests the forward end of a small lever, 36, which is held thereagainst by a tension spring, 37. Directly underneath and in line with the cylinder 30, on the interior of the casing 18, is affixed a frame, 38, containing a helix or spiral spring composed of a continuous strip of two metals having different ratios of expansibility, so as to produce an axial or rotary motion in a well-known manner. One end of this spiral is attached to the frame 38, which is provided with a threaded hub for securing the said frame to the wall of the boiler, and the other end of said spring is fastened to the periphery of a small disk, 39, which is mounted on the inner end of the shaft 40, which carries on its outer end an adjustable cam projection, 41, said projection serving to operate upon the lever 36 in a manner to be hereinafter explained.

The operation is as follows: When the soda refuses to absorb the exhaust, and therefore has become saturated up to the point of back-pressure, and consequently requires regeneration or reconcentration, the increased pressure incident upon the unabsorbed exhaust-steam will outwardly force the piston-rod 31 of the switch-cylinder until the bridge or contact piece 34 makes contact with the terminals 32 32 of the secondary circuit from the transformer 33, thereby closing the circuit and causing the current to simultaneously traverse the wire 42, the coil 22, and the wire 43 back to the transformer, the upper and lower ends of the coil 22 being insulated from their supports, as shown clearly in Figs. 8 and 10. At the same instant the bridge-piece makes contact with the terminals 32 32 the projection 35 will pass beyond the end of the lever 36, which will then be forced up by spring 37 on the curve of the projection 35 and will be there held until disengaged. Also, at the same time the piston-rod is moved forward, the lever 44, which is moved by pin 45 on the said piston-rod, is actuated, thereby opening the rotary valve 46 and allowing the blow-off pipe to be open. Thus the current will continue to traverse its path until the heat absorbed by the caustic soda becomes sufficiently intense to expand or dilate the spiral spring of the thermostat, which action will rotate the shaft 40, and consequently the cam 41, which will in its revolution engage the lever 36 and compress the spring 37, thereby releasing the other end of the lever from engagement with the projection 35 and allowing a coil-spring (not shown) within the cylinder to retract the piston-rod, thus breaking the circuit and closing the valve 46, the parts again assuming the position shown in Fig. 8.

Referring to the modification of the before-described generator (shown in Fig. 10) the principle of operation is similar to that illustrated in Fig. 8, except that the blow-off pipe is operated independently by an expansible spring safety-valve, as shown. The chamber 23 is dispensed with, and the steam-reservoir is formed by the upper coils of the water-coil 20. The steam is superheated in a single vertical downwardly-projecting pipe passing through the soda solution. The conductor for the electric current is made in the form of a coil and passes perpendicularly through the solution, and the coil 3 is provided with a branch safety-pipe, 47, which may either communicate with the atmosphere or be connected to a suitable condenser, the function of which is to condense the steam into water, so that it may be returned to the coil 20 by an injector. (Not shown.) In either case I would consider it advisable to have a plug made of suitable fusible metal—such as is shown at 48, Fig. 10—so that in case of the coil 20 being supercharged with steam the heat developed thereby would be sufficient to melt the plug 49 and give vent to such overcharge. In all other respects these respective constructions correspond. Consequently I have, in order to run the primary circuit continuously throughout the train, provided the coupling devices shown in Figs. 11 and 11ª for the purpose of automatically preserving the electrical continuity of the circuit, which coupling will be described hereinafter. However, as this system would be attended by a great expense, owing to the number of boilers employed and to the cost of wiring the entire train, I would consider it preferable to employ the system shown in Fig. 12—i. e., when there is but one boiler utilized, and where the source of electricity and the transformer are both located upon the same car as the steam-boiler. In this latter instance the current-generator is preferably of the alternating type, and is geared to the axle of the car, and is operated by the momentum of the train.

When the soda solution within the chamber 27 of the boiler (shown in Fig. 12) refuses to further freely absorb the exhaust-steam, the thermostat (shown in Fig. 11ᵇ) will operate the switching devices previously described, and thereby close the secondary circuit from the transformer 33 and allow the electric current of heavy heating effect to traverse its path through the caustic solution for the purpose of evaporating any undesirable moisture deposited by the return or exhaust steam and reheating the soda, as before stated. Therefore, from the above statement it will be apparent that the current generated from the alternating dynamo geared to the axle of the vehicle must be supplied during these reheating and evaporating periods in a constant manner, and must not vary in quantity and heating effect. Furthermore, it will be obvious that, inasmuch as the said dynamo is driven by the momentum of the train, the amount of current generated thereby will vary according to the varying speed of the train on grades, &c. Thus it will be understood that means must be provided for storing up the electricity so generated, in order to supply a constant and available source at all times, and, moreover, adequate apparatus must be furnished for maintaining the generation of the charging current in a uniform manner without regard to the speed of the train, (the speed of the armature of the dynamo.) Accordingly I have devised the electro-mechanical means shown in Figs. 12, 13, and 14 for accomplishing the above mentioned results.

50 represents an alternating dynamo geared to and driven by the axle 51 of the baggage-car. (Shown in Fig. 12.) As shown more clearly in Fig. 13, the field-coils of said dynamo are connected, respectively, to the binding-posts 52 52 and extend therefrom in a cable, 53, to the contact-points 54 54 of the switch. (Shown in Fig. 14.)

55 indicates an insulated switch-arm centrally pivoted at the point 56 and provided on its forward extremity with arc-shaped bridge or contact piece 57, adapted to make electrical connection with the points 54 54, and having on its inner end the link-rod 58, pivoted to the upper end of the core 59 of the solenoid 60, which latter has the terminals of its helix in circuit with the charging-circuit 61 62 by the shunt-circuit 63. (See Fig. 14.) The charging-circuit 61 62 is connected in series with the secondary battery 64 and is provided with a circuit-closing switch, 68.

66 designates an adjustable resistance in the shunt circuit 63, for the purpose of regulating the amount of current for energizing the solenoid 60, according to the amount admitted to the battery 64. The battery 64 is set to receive a predeterminated quantity of energy from the dynamo 50, which quantity shall be generated by the normal or mean rate of speed of the train. For example, the speed of an ordinary railway-train rarely ever exceeds forty miles per hour. Then the battery is set to receive no more current than is generated by the speed of the armature when the train is running at the rate of forty miles per hour. Now should the momentum of the train decrease, (and consequently that of the armature,) then it would be necessary to cut more of the field-coils into the charging-circuit, so as to proportionally increase the generation of current. In such event, the speed of the armature being lessened, and therefore the current supplied to the charging-circuit being diminished, there will be a lesser quantity flowing through the circuit 63 for energizing the coils of the solenoids 60. Consequently the magnetic attraction for the core 59 will proportionally decrease, allowing the retracting-spring 67 to gradually withdraw the said core, which action will force the bridge-piece 57 to move in the arc of a circle in the direction of the arrow, thereby making contact with points 54 54 and cutting in a proportionate number of field-coils until the amount of current in the charging-circuit is augmented to the normal quantity, and the coils of the solenoid resume their normal state of energization.

It will be understood that the secondary battery may be set to receive a minimum or maximum amount of current, and that the switch may be arranged to cut in or out the field-coils of the dynamo, according to the requirement of the battery. Again, there might be two dynamos, one geared to each axle, and each having an independent charging-circuit, or they might be coupled in series, parallel, or in any other approved and convenient manner. However, neither the arrangement nor construction of the dynamo will be further dwelt upon herein, as the same will form the subject-matter of a future application.

The working-circuit 69 70 extends from the storage-battery 64 to the terminals of the primary coils of the transformer 33, the secondary coils of which are connected in the manner shown in Figs. 8, 10, and 12 to the upright form of boiler previously described.

As shown in Fig. 12, the charging-circuit passes through the box 71, containing the solenoid 60, to the secondary battery 64, which is located centrally underneath the flooring of the car, and the working-circuit 69 70 extends from the battery to the transformer 33, which in this figure is only shown conventionally, it being in practice preferable to place said transformer in a boxing of convenient construction located in proximity to the boiler or generator, thereby giving a more convenient and efficient conversion of current. The solenoid 60 is also located in a suitable casing on the car, and is placed intermediately in the charging-circuit between the dynamo and the storage-battery.

The couplings between the respective cars for preserving the continuity of the steam-distributing pipes are of an ordinary or approved construction, such as those which are used for this purpose on existing cars.

The circuit-coupling (shown in diagram in Fig. 9 and in detail in Fig. 11) consists of two perforated portions, 72 72, each having its inner end shaped like the draw-head of an ordinary car-coupling and its outer end provided with a peripheral flange, 73, over which is slipped one end of the rubber tube 74; and 75 is a clamping-ring which fits around and holds the said rubber tube in position over the flange 73, as shown clearly in Figs. 11 and 11ª. In one semicircular cross-section of each draw-head is formed a circular chamber or recess, 76, to the interior walls of which are riveted two curved springs, 77, which are secured opposite to each other and are so arranged as to have their forward curved ends, 78, in contact, the tension of said springs being exerted centrally. In the other cross-section of the draw-head is screwed a metallic current-conducting plug, 79, longitudinally divided by a strip of insulation, 80. The circuit-wires 81 82 are enveloped in an insulating-cable, as shown, and are passed longitudinally through their perforations in the portions 72 72, respectively, to the springs 77 and the plug 79; and 83 designates a branch or shunt connecting on one side the wire 82 with the lower spring 77, and on the other side the wire 81 with the other spring 77. Thus it will be understood that when these pendent couplings are connected the respective plug will engage its corresponding recess and will be electrically in contact with the proper spring 77 for completing the metallic circuit throughout the train. Should the rear or front car become disconnected, the consequent removal of the plug 79 will allow the springs 77 77 to automatically come electrically in contact, thereby closing the circuit at that point and preserving the path of the current through the shunt or branch 83.

In Fig. 11ª the springs, instead of facing the opening in the draw-head, are simply reversed. However, their operation is identical.

By the employment of the secondary battery and the solenoid switch a uniform unvarying quantity of current is transformed in the heating-circuit, thus furnishing a safe and reliable source of electrical energy, which can be utilized, even though the train is at a standstill, for either reheating or lighting, or both. Furthermore, it will be obvious that when the train equipped with this system of electro-chemical heating is standing for any length of time at a station the storage-battery may be recharged by connecting it with the charging-circuit of any convenient stationary plant; but no arrangement for accomplishing this has been illustrated, inasmuch as any one skilled in this art would be enabled to avail himself of such expedient.

As will be obvious from the foregoing description and drawings, the various functions of the apparatus are performed automatically, requiring no personal attention whatsoever, except a periodical cleaning out after the soda has been completely exhausted from long and continued use and the substitution of a fresh supply of water for that evaporated. Furthermore, as no fire whatsoever is used, no casualties can occur and no explosions can result from the character of steam employed. In addition, the current-regulating devices are so arranged and adjusted that the amount of steam generated by the solution is entirely under control and never exceeds that drawn for use in the radiators, as a larger consumption will be followed by a corresponding production, and vice versa.

By the periodical application of the electric current of the proper strength (quantity) for a few minutes directly to the solution sufficient strength can be imparted to said solution to generate the heat necessary for a number of hours. Moreover, as the most efficient and economical effects in steam-heating systems are available only by utilizing low pressure, the regenerating period might be arranged at long intervals apart, and the heat-storing properties can be employed to much better advantage than with high pressure, as is required for motive-power purposes. Finally, I desire it to be understood that although I have shown several forms of steam generators, which are claimed only in conjunction with the electromechanical appliances for reheating and revivifying the heat-generating substance, I do not claim these forms generically herein; nor, likewise, do I claim the automatic electrical coupling and other features, as they are all reserved as the subject-matter of future applications.

Having thus fully described my invention, what I claim, and desire to secure by Letters Patent, is—

1. An electro-chemical steam-generator having a water-compartment, a chamber for the caustic substance adjacent to said compartment, a steam-chamber communicating with said water-compartment, means for distributing the generated steam and for returning the exhaust to the chamber containing the caustic substance, an electric circuit passing through the heat generating substance, for the purpose set forth, an automatic circuit-controller for said circuit, and a suitable source of electricity, all arranged to co-operate substantially in the manner specified.

2. The combination, with a chamber containing a heat-generating substance, of an electric conductor passing through and in contact with said substance and forming part of an electric circuit, a circuit-controller for said circuit, the circuit, and a suitable source of electricity furnishing currents of low potential and large quantity.

3. The combination, with the water-compartment of a steam-generator, of a chamber located in proximity to said water-compartment and containing a heat-generating substance, an electric circuit passing through said heat-generating substance, for the purpose set forth, and an automatic circuit-controller for said circuit, and a suitable source of electricity, as specified.

4. In a steam-boiler, the combination, with the compartment containing the chemical heat-generating substance, of the water-chamber located in proximity to the compartment containing the chemical substance, the steam-space communicating with the water-compartment, a superheating chamber or reservoir, also in proximity to the substance-compartment, pipes for distributing the generated steam to points for consumption and for returning same to the generating-chamber, and an electric circuit and circuit-controller therefor for periodically evaporating the steam deposited in the generating-compartment and for reheating said chemical substance, as described.

5. The combination, with the compartment containing the chemical heat-generating substance, of the exhaust-pipe communicating with said compartment, and an electric circuit and circuit-controller therefor for periodically evaporating the moisture from said substance and for reheating the same by means of an electric current of the required heating effect.

6. The combination, with a compartment of a steam-generator containing a heat-generating substance, of an electric circuit passing through said substance, a circuit-controller operated by the thermostatic conditions of said substance for controlling the passage of an electric current through said substance, for the purpose set forth, and a suitable source of electricity furnishing currents of low potential and large quantity.

7. The combination, with the compartment containing the chemical heat-generating substance saturated with exhaust-steam, of an expansible thermostat arranged to be expanded and contracted by the temperature of said chemical substance, an electric circuit passing through said heat-generating substance for evaporating the exhaust-steam from said substance, a circuit-controller for said circuit operated by said thermostat, and a source of electricity furnishing currents of low potential and large quantity, as described.

8. The combination, with the chamber containing the chemical heat-generating substance, of the exhaust-pipe communicating with said chamber, the switching-cylinder and its spring-actuated piston operated by the back-pressure of said exhaust, an automatic circuit-controller operated by said piston to close an electric circuit, and the expansible thermostat arranged to break the electric circuit by the variation of the temperature of the chemical substance, as described.

9. The combination, with the compartment containing the chemical heat-generating substance, of an exhaust-steam pipe communicating with said compartment, a safety or blow-off pipe, also communicating with said compartment, a valve located in said blow-off pipe, and an automatic circuit-controller operated by the back-pressure in said compartment to close an electric circuit and to open the valve in the blow-off pipe, as specified.

10. The combination, with the compartment containing the chemical heat-generating substance, of an exhaust-steam pipe communicating with said compartment, a blow-off pipe, also in communication with said compartment, an automatic safety-valve located in said blow-off pipe, and an automatic circuit-controller for periodically closing an electric circuit operated by the back-pressure in the said compartment, as set forth.

11. The combination, with two or more steam-generators located, respectively, in different coaches of a railway-train, of a compartment in each generator containing a heat-generating substance, an electric circuit passing through said substance, a circuit-controller for said circuit, a source of electricity located at a different point on said train from the generators, and an automatic coupling between the several coaches carrying the said generators for the purpose of preserving the continuity of the said electric circuit throughout the train, as set forth.

12. In a railway-car, the combination, with a chamber containing caustic soda, potash, lye, or their equivalents, of a water-compartment in proximity to said chamber, a steam-space communicating with said water-compartment, a tube leading from the steam-space through the caustic substance to the distributing-pipe, the distributing-pipe, the exhaust or return pipe terminating in and communicating with the chamber containing the caustic substance, an electric conductor in contact with said caustic substance, an automatic circuit-controller operated by the temperature of said caustic substance, and the circuit, as specified.

13. The combination, with a source of electricity, of means for transforming the current furnished by said source into a current of increased volume, the circuit, a compartment containing a chemical heat-generating substance, and an automatic circuit-controller for periodically closing the said circuit according to the varying temperature of the said caustic substance, as specified.

14. The combination, with a steam-boiler having a compartment containing a chemical heat-generating substance, of an electric conductor in contact with said substance and in circuit with an inductional transformer, an automatic circuit-controller for periodically changing an electric circuit according to the temperature of the chemical substance, an inductional transformer having a primary of fine wire and a secondary of coarser wire and in circuit with an alternating dynamo, and an alternating dynamo operated by the momentum of a train.

15. The combination, with a steam-boiler having a compartment containing a chemical heat-generating substance, of an electric conductor in contact with said substance and in circuit with an inductional transformer, an automatic circuit-controller for periodically changing an electric circuit according to the temperature of the said chemical substance, an inductional transformer having a primary of fine wire, a secondary of coarser wire, and in circuit with an alternating dynamo, a current-regulating solenoid switch for maintaining a uniform generation of current by cutting in or out the field-coils, and an alternating dynamo operated by the momentum of the train.

16. The combination, with a steam-boiler having a compartment containing a chemical heat-generating substance, of an electric conductor in contact with said substance, and in circuit with an inductional transformer, automatic circuit-controller for changing an electric circuit according to the temperature of the chemical substance, an inductional transformer having a primary of fine wire, a secondary of coarser wire, and in circuit with an alternating dynamo, a current-regulating solenoid switch for maintaining a uniform generation of current by cutting in or out the field-coils, a secondary battery in circuit with the said solenoid switch and with the primary of the inductional transformer, and an alternating dynamo operated by the momentum of the train, as specified.

In testimony whereof I affix my signature in presence of two witnesses.

ELIAS E. RIES.

Witnesses:
LEOPOLD RIES,
JNO T. MADDOX.